US011113488B2

(12) United States Patent
Zhao et al.

(10) Patent No.: US 11,113,488 B2
(45) Date of Patent: Sep. 7, 2021

(54) GLASS PANEL MANUFACTURING SYSTEMS AND METHODS

(71) Applicant: LUOYANG LANDGLASS TECHNOLOGY CO., LTD., Luoyang (CN)

(72) Inventors: Yan Zhao, Luoyang (CN); Gaofeng Dou, Luoyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 0 days.

(21) Appl. No.: 16/633,569

(22) PCT Filed: Aug. 20, 2018

(86) PCT No.: PCT/CN2018/101270
§ 371 (c)(1),
(2) Date: Jan. 23, 2020

(87) PCT Pub. No.: WO2019/037677
PCT Pub. Date: Feb. 28, 2019

(65) Prior Publication Data
US 2020/0202090 A1 Jun. 25, 2020

(30) Foreign Application Priority Data

Aug. 22, 2017 (CN) .......................... 201710725107.6
Aug. 22, 2017 (CN) .......................... 201710725108.0
(Continued)

(51) Int. Cl.
*G06K 7/14* (2006.01)
*B23K 26/362* (2014.01)
*G01L 1/24* (2006.01)

(52) U.S. Cl.
CPC .......... *G06K 7/1404* (2013.01); *B23K 26/362* (2013.01); *G01L 1/24* (2013.01)

(58) Field of Classification Search
CPC .............................. G06F 16/381; G06F 7/1404
(Continued)

(56) References Cited

U.S. PATENT DOCUMENTS

| 2003/0047538 | A1* | 3/2003 | Trpkovski | B23K 26/10 216/84 |
| 2014/0084069 | A1* | 3/2014 | Mizukoshi | G06K 7/12 235/468 |
| 2019/0144323 | A1* | 5/2019 | Oh | G01L 1/24 65/29.19 |

FOREIGN PATENT DOCUMENTS

| CN | 101075025 A | 11/2007 |
| CN | 104596687 A | 5/2015 |

(Continued)

OTHER PUBLICATIONS

International Search Report and Written Opinion dated Nov. 15, 2018, issued in corresponding International Patent Application No. PCT/CN2018/101270.

*Primary Examiner* — Toan C Ly
(74) *Attorney, Agent, or Firm* — Morgan, Lewis & Bockius LLP

(57) ABSTRACT

The present disclosure discloses a mobile scanning device for retrieving stress information of one of a plurality of reinforced glass panels. The device includes an image capturing device to capture an image of an identification code installed on a surface of the one of the plurality of reinforced glass panels, an image processor to process the captured image and recognize the identification code, a central processor to instruct the mobile scanning device to retrieve stress information corresponding to the identification code from a glass panel production information database, and a display device to display the retrieved stress information. The stress information was obtained via at least one stress sensor testing a stress at different testing locations on a (Continued)

surface of each of a plurality of glass panels being processed on a production line for manufacturing the plurality of reinforced glass panels.

9 Claims, 11 Drawing Sheets

(30) Foreign Application Priority Data

| Dec. 6, 2017 | (CN) | 201711276045.1 |
| Dec. 6, 2017 | (CN) | 201721680794.6 |
| Jan. 2, 2018 | (CN) | 201810001195.X |
| Jan. 2, 2018 | (CN) | 201820001694.4 |

(58) Field of Classification Search
 USPC .................................................. 235/454, 375
 See application file for complete search history.

(56) References Cited

FOREIGN PATENT DOCUMENTS

| CN | 105069584 A | 11/2015 |
| CN | 105652829 A | 6/2016 |
| CN | 106251161 A | 12/2016 |
| CN | 107628754 A | 1/2018 |
| CN | 107677402 A | 2/2018 |
| CN | 107991007 A | 5/2018 |
| CN | 108335117 A | 7/2018 |

* cited by examiner

GLASS PANEL MANUFACTURING SYSTEMS AND METHODS

PRIORITY CLAIM AND RELATED APPLICATIONS

This application is a U.S. national stage application of the PCT International Application No. PCT/CN2018/101270 filed on Aug. 20, 2018, which claims the benefit of foreign priority to the following applications, each of which is incorporated by reference in its entirety:

Chinese Patent Application No. 201710725108.0, filed on Aug. 22, 2017, entitled "GLASS PANEL STRESS ON-PRODUCTION-LINE TESTING METHOD;"

Chinese Patent Application No. 201710725107.6, filed on Aug. 22, 2017, entitled "GLASS PANEL AND MANUFACTURING METHOD THEREOF;"

Chinese Patent Application No. 201711276045.1, filed on Dec. 6, 2017, entitled "SYSTEM AND METHOD FOR INQUIRING GLASS PANEL MANUFACTURING INFORMATION;"

Chinese Utility Model Application No. 201721680794.6, filed on Dec. 6, 2017, entitled "SYSTEMS FOR INQUIRING GLASS PANEL MANUFACTURING-INFORMATION;"

Chinese Patent Application No. 201810001195. X, filed on Jan. 2, 2018, entitled "GLASS PANEL STRESS TESTING APPARATUS;" and Chinese Utility Model Application No. 201820001694.4, filed on Jan. 2, 2018, entitled "GLASS PANEL STRESS TESTING APPARATUS."

FIELD OF THE TECHNOLOGY

Embodiments of the present disclosure relate to the field of glass panel deep processing, and in particular, to systems and methods for manufacturing reinforced (i.e., tempered or semi-tempered) glass panels bearing on-production-line manufacturing information including stress information, to systems and methods for reinforced glass panels' on-production-line stress detecting and processing, to a reinforced glass panel bearing the on-production-line manufacturing information, to on-production-line glass panel stress testing methods and apparatus, and/or to systems and methods for detecting, providing, and retrieving the on-production-line manufacturing information.

BACKGROUND

A tempered glass panel is also known as a reinforced glass panel, which is a pre-stressing glass panel. Usually, the glass panel is processed with chemical or physical methods to form a compressive stress on the surface of the glass panels. When encountered with external stress, the glass panels' surface stress is offset first to increase the glass panels loading capacity. Tempered glass panels are widely implemented in building doors and windows, glass curtain walls and electronic instruments, etc.

The stress information of tempered glass panel is a critical parameter characterizing whether the tempered glass panel passes quality control thresholds. During glass panel production, glass panel stress testing is usually conducted to measure glass panel quality and to ensure glass panel safety. In the conventional testing, stress sensors are used to manually test certain testing areas on a single selected glass panel, the testing area is selected randomly according to human experience. The product quality information tested usually includes glass panel waviness, bow, and at least one of the surface stresses. Accordingly, such manual testing cannot obtain accurate information regarding the compressive and tensile stress and stress distribution of the glass panels. In addition, it is impossible to obtain stress information for each glass panel produced, and as a result, it is impossible to keep track of the quality information of every glass panel. When a quality accident happens, it is also impossible to track the origin of the quality issue.

In another conventional testing called grazing angle surface polarimetry ("GASP"), when a beam of light is shed on the surface of the tempered glass panel, in the close vicinity of the glass panel surface, the light travels along the direction parallel to the surface of the glass panel for a short distance. When there is no stress on the surface, total internal reflection is achieved when the angle of incidence is a critical angle, i.e., the light travels along the surface and the light is reflected by a critical angle. When stress exists on the surface of the glass panel, the total internally reflected incident light is affected by the surface stress to achieve birefringence to produce two beams of light travelling in different directions with polarization orthogonal to each other. These two beams of light can be converted into two groups of easily identifiable stripes through imaging devices, by comparing the relative positions of the stripes in the two groups, the surface stress of the glass panels can be calculated. The conventional testing, however, can only conduct off-production-line stress testing. The glass panel needs to be removed from the production line manually which wastes a lot of time and effort, resulting in low efficiency. Also, the testing can only be conducted on a selected single glass panel. In addition, when the glass panel is fixed in a location, there is only one fixed testing area which cannot be changed easily and quickly, making it impossible for multi-location testing to measure stress distribution.

SUMMARY

According to one aspect of the embodiments of the present disclosure, which addresses the above-described problems, an exemplary glass panel stress on-production-line testing system for testing a plurality of glass panels and retrieving stress testing information is disclosed. The exemplary glass panel stress on-production-line testing system includes an identification code installed on a surface of each of the plurality of glass panels, the identification code being unique to each of the plurality of glass panels. The system also includes at least one stress sensor for testing stress on the surface of each of the plurality of glass panels on-production-line, and a sensor controller for placing the at least one stress sensor on different testing locations on the surface of each of the plurality of glass panels. The sensor controller is functionally connected to the at least one stress sensor, and the sensor controller moves the at least one stress sensor along directions parallel to the surface of each of the plurality of glass panels and along the direction vertical to the surface of each of the plurality of glass panels. In addition, the system includes a control server connected to the sensor controller to control the at least one stress sensor, and a glass panel information database connected to the control server, wherein on-production-line stress testing data collected from the at least one stress sensor is stored in the database using the identification code. In some embodiments, the system further includes a mobile scanning device coupled to the glass panel information database, wherein the mobile scanning device reads the identification code installed on a surface of one of the plurality of glass panels and accesses the database to retrieve the on-production-line stress testing data for the glass panel and displays the retrieved on-production-line stress testing data on a display screen of the mobile scanning device for verifying whether the stress of the glass panel meets a local or national safety requirement.

According to one aspect of the embodiments of the present disclosure, an exemplary identification code is encoded with a two dimensional code. According to one aspect of the embodiments of the present disclosure, the exemplary identification code is encoded with a bar code. According to one aspect of the embodiments of the present disclosure, the exemplary identification code is printed on a surface of each of the plurality of glass panels. According to one aspect of the embodiments of the present disclosure, the exemplary identification code is laser printed on the surface of each of the plurality of glass panels. According to one aspect of the embodiments of the present disclosure, the mobile scanning device is a mobile smart phone equipped with a scanner.

According to one aspect of the embodiments of the present disclosure, an exemplary method for on-production-line glass panel stress testing and information retrieving on a plurality of glass panels is disclosed. The method includes the steps of: installing an identification code on a surface of each of the plurality of glass panels, the identification code being unique to each of the plurality of glass panels; establishing a record in a glass panel information database using the identification code for each of the plurality of glass panels; processing each of the plurality of glass panels using a tempering or semi-tempering process; saving processing information into the glass panel information database using the identification code; conducting stress testing on each of the plurality of glass panels with at least one stress sensor while the glass panel is on production-line; saving on-production-line stress testing information into the glass panel information database using the identification code; and reading the identification code on a surface of one of the plurality of glass panels to retrieve processing information and on-production-line stress testing information for verifying whether the stress of the glass panel meets a local or national safety requirement, wherein the scanning is conducted at a location distant from where the process and on-production-line stress testing were conducted.

According to one aspect of the embodiments of the present disclosure, the installing of an identification code on a surface of each of the plurality of glass panels is achieved by printing the identification code on the surface of each of the plurality of glass panels. According to another aspect of the embodiments of the present disclosure, the installing of an identification code on a surface of each of the plurality of glass panels is achieved by etching the identification code on the surface of each of the plurality of glass panels. According to one aspect of the embodiments of the present disclosure, the glass panel information database is a cloud accessible remote database. According to one aspect of the embodiments of the present disclosure, the method for on-production-line glass panel stress testing and information retrieving further includes a step of displaying the retrieved processing information and stress testing information on a user interface local to where the reading is conducted. According to one aspect of the embodiments of the present disclosure, the reading is conducted by scanning the identification code using a scanner.

According to one aspect of the embodiments of the present disclosure, an exemplary on-production-line glass panel stress testing apparatus, installed close to a conveyer of a glass panel tempering production line, for testing stress of a plurality of glass panels being processed on the production line is disclosed. The apparatus includes: a supporting frame for fixing the glass panel stress testing apparatus at a predetermined testing location close to a conveyer of a glass panel tempering production line; and a glass panel stress testing module. The glass panel stress testing module further includes: a stress sensor for detecting stress information of each of the plurality of glass panels; a refractive fluid sprayer for spraying refractive fluid onto the stress sensor; and a platform, wherein the stress sensor and the refractive fluid sprayer are installed on the platform, and a horizontal driving device for driving the platform to reciprocate along a direction vertical to the conveyer moving direction.

According to one aspect of the embodiments of the present disclosure, the exemplary glass panel stress testing apparatus further includes a rotating electric motor for driving the platform; a driving gear installed on the end of the output axle of the rotating electric motor; a passive gear, engaged to the driving gear, installed on the output axle of the rotating electric motor. In some embodiments, the platform of the glass panel stress testing module further comprises an axel, and the platform is configured to rotate around the axel.

According to one aspect of the embodiments of the present disclosure, the exemplary on-production-line glass panel stress testing apparatus further includes an eraser unit for erasing refractive fluid off the surface of the glass panel. The eraser unit is installed on the platform. According to one aspect of the embodiments of the present disclosure, the eraser unit further comprises: an eraser head for erasing refractive fluid off the surface of the glass panel; a first electric motor for driving the eraser head; a second elevator for driving the eraser head and elevating the first electric motor. The eraser heads are implemented on the output axle of the first electric motor along a radial direction of the axle, and the first electric motor is fixed on the platform through the second elevator.

According to one aspect of the embodiments of the present disclosure, the exemplary on-production-line glass panel stress testing apparatus further includes a first elevator, wherein the stress sensor is installed on the first elevator on the platform. According to one aspect of the embodiments of the present disclosure, the first elevator further comprises a servo cylinder and a buffer mechanism, and the stress sensor is implemented on the screws of the servo cylinder through the buffer mechanism.

According to one aspect of the embodiments of the present disclosure, the buffer mechanism further comprises: a buffer installation panel; spiral springs; guiding poles; a sensor installation panel; a stress sensor; and a stress sensor installation panel. In some embodiments, one end of the guiding poles is fixed on the buffer installation panel, and the guiding poles also passes through the spiral springs. With the sensor installation panel and stress sensor installation panel from bottom to top, the stress sensor is fixed on the stress sensor installation panel, and the stress sensor is implemented on the sensor installation panel to measure the stress of the spiral springs.

According to one aspect of the embodiments of the present disclosure, the refractive fluid spaying mechanism further includes a sprayer for spraying the refractive fluid to the surface of the glass panel, and a rotating cylinder for driving the sprayer to rotate relative to a predetermined axis. The sprayer is fixed on the rotating cylinder, which is installed on the platform.

The present application also discloses a mobile scanning device for retrieving stress information of one of a plurality of reinforced glass panels. The mobile scanning device comprises: an image capturing device to capture an image of an identification code installed on a surface of the one of the plurality of reinforced glass panels, wherein the identification code is unique to each of the plurality of reinforced glass panels; an image processor, coupled to the image capturing device, to process the captured image and recognize the identification code; a central processor, coupled to the image processor, to instruct the mobile scanning device to retrieve stress information corresponding to the identification code from a glass panel production information database; and a display device, coupled to the central processor, to display the retrieved stress information; wherein the stress information was obtained via at least one stress sensor testing a stress at different testing locations on a surface of each of a plurality of glass panels being processed on a production line for manufacturing the plurality of reinforced glass panels.

In some embodiments, the central processor of the code-reader may be further configured to: retrieve, from a product standard database, a product standard including a required stress for a reinforced glass panel in a particular geographical area based on geographical location information of the mobile scanning device; compare the retrieved product standard with the retrieved stress information corresponding to the identification code to determine whether the one of the plurality of reinforced glass panels complies with the product standard; and instruct the display device to display a result of the comparison.

The present disclosure further discloses an exemplary method for a mobile scanning device for retrieving stress information of one of a plurality of reinforced glass panels. The method comprises: capturing, via a mobile scanning device, an image of an identification code installed on a surface of the one of the plurality of reinforced glass panels, wherein the identification code is unique to each of the plurality of reinforced glass panels; processing the captured image to recognize the identification code; instructing the mobile scanning device to retrieve stress information corresponding to the recognized identification code from a glass panel production information database; and displaying the retrieved stress information on the mobile scanning device; wherein the stress information was obtained via at least one stress sensor testing a stress at different testing locations on a surface of each of a plurality of glass panels being processed on a production line for manufacturing the plurality of reinforced glass panels.

The present disclosure also discloses an exemplary reinforced glass panel. The reinforced glass panel comprises: a glass plate, which was one of a plurality of glass plates that were processed on a production line for manufacturing a plurality of reinforced glass panels; and a first identification code installed on a surface of the glass plate, wherein the first identification code being an identification code installed on a surface of each of the plurality of glass plates respectively, and the identification code is unique to each of the plurality of glass plates; wherein: stress information for each of the plurality of reinforced glass panels was obtained via at least one stress sensor testing a stress at different testing locations on a surface of the each of the plurality of reinforced glass panels on the production line, and was stored in a glass panel production information database based on the identification code; and stress information of the reinforced glass panel is retrieved based on the first identification code being read via a mobile scanning device. In some embodiments, a product standard including a required stress for the reinforced glass panel in a particular geographical area is retrieved from a product standard database based on geographical location information of the mobile scanning device; the retrieved product standard is compared with the retrieved stress information of the reinforced glass panel to determine whether the reinforced glass panel complies with the product standard; and a result of the comparison is displayed on the mobile scanning device.

BRIEF DESCRIPTION OF THE DRAWINGS

To describe the technical solutions in the exemplary embodiments of the present disclosure more clearly, the following briefly describes the accompanying drawings required for describing the embodiments. The accompanying drawings in the following description show merely some exemplary embodiments of the present disclosure, and a person of ordinary skill in the art may still derive other drawings from these accompanying drawings without creative efforts. Wherever possible, the same reference numbers will be used throughout the drawings to refer to the same or like parts.

DETAILED DESCRIPTION

To make the objectives, technical solutions, and advantages of the present disclosure clearer, the following further describes the embodiments of the present disclosure in detail with reference to the accompanying drawings.

Figure 1:
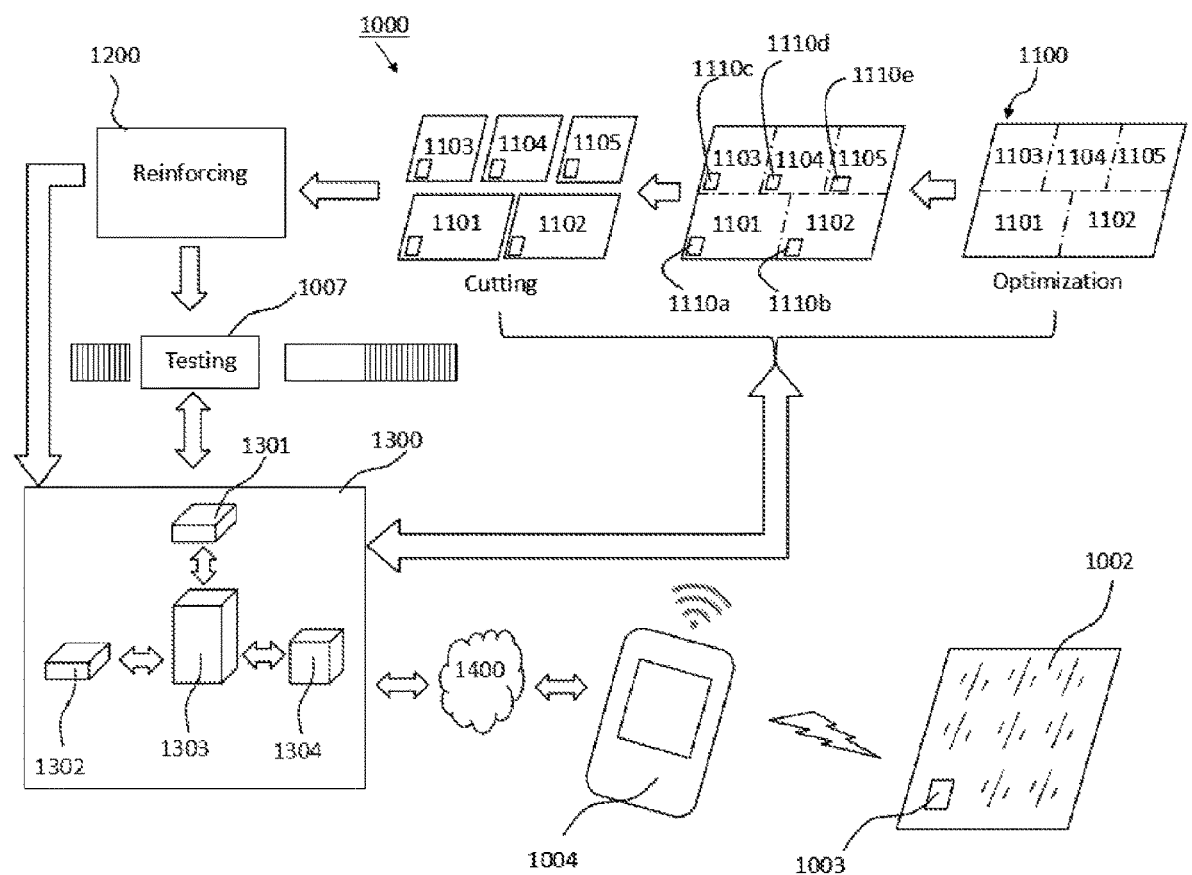
FIG. 1 is a schematic illustration of an exemplary system for manufacturing reinforced glass panels and for on-production-line detecting, inquiring, and providing production information of the glass panels, in accordance with some embodiments.

FIG. 1 is a schematic illustration of an exemplary system 1000 for manufacturing reinforced glass panels and for on-production-line detecting, inquiring, and providing production information of the glass panels, in accordance with some embodiments. According to some embodiments, the system performs an optimization process on a glass substrate 1100. The optimization process plans to divide or cut glass substrate 1100 into a plurality of glass panels, for example 1101, 1102, 1103, 1104, and 1105, each which may be in a same size as another. In some embodiments, the plurality of glass panels may be in different sizes. The optimization utilizes mathematical methods to geometrically maximizes the utility of the substrate 1100 to produce more glass panels on each single given substrate 1100 and reduce waste.

After the optimization, the boundaries of the plurality of glass panels 1101, 1102, 1103, 1104, and 1105 are planned on the substrate 1100. In some embodiments, the optimization information, such as the information about the boundaries and sizes of each glass panel, is stored in identification codes or patterns for fast processing. Also, each identification code or pattern uniquely identifies one of the plurality of glass panels and is configured along an edge or on a corner of the corresponding glass panel. In some embodiments, the optimization information is stored in a database based on the unique identification codes or patterns. An identification code or pattern is implemented on a corner of each corresponding glass panel. For example, identification codes or patterns 1110a, 1110b, 1110c, 1110d, and 1110e are each implemented along an edge or on a corner of corresponding glass panels 1101, 1102, 1103, 1104 and 1105, respectively. According to some embodiments, the identification code or pattern may be a bar code, a two-dimensional code such as a quick response (QR) code, or a character string, etc. According to some embodiments, the identification code or pattern is printed (including laser printing), etched, or affixed on the glass substrate/panel. According to some embodiments, the two-dimensional code is installed on the glass substrate/panel by laser etching, spraying, chemical etching, or physical affixation or gluing. In some embodiments, the identification code or pattern is visible light recognizable. In some embodiments, the identification code or pattern is invisible light recognizable. According to some embodiments, the identification code or pattern serves as a unique identifier for each corresponding glass panel in a glass panel production information database 1301 in the information storage and processing facility 1300. According to some embodiments, the glass panel production information database 1301 stores production and testing information throughout the life cycle of each corresponding glass panel based on the unique identification code or pattern. According to some embodiments, the production and testing information includes information regarding the optimization discussed above.

According to some embodiments, when the optimization is finished and the boundaries appropriately planned, the glass panels are cut according to the optimization information (e.g., the planned boundaries and sizes) retrieved from or based on the identification codes or patterns, producing glass panels bearing identification codes or patterns on their corners. According to some embodiments, the cut glass panels are fed into a tempering or semi-tempering facility 1200 for reinforcing (i.e., tempering or semi-tempering) processing. Information (e.g., strength, thermal resistance, toughed degrees, responsible person(s) for each manufacturing process, etc.) obtained during the reinforcing process is also saved into the glass panel production information database 1301 using unique identifiers corresponding to the identification codes or patterns. According to some embodiments, on-production-line testing equipment is deployed on a deep processing production line 1007 to obtain product quality information (e.g., stress information, reinforcing quality, etc.), which is then uploaded to production information database 1301 by a control unit 1303 of the production line based on the identification codes or patterns. According to some embodiments, information related to the geographical locations of the glass panels are also collected and stored in the glass panel production information database 1301 based on the identification codes or patterns. The information related to the geographical locations of the glass panels includes, but not limited to, where the glass substrates are produced, where the glass panels are cut and reinforced, where other processing and testing are conducted. The information related to the geographical locations of the glass panels are implemented to invoke corresponding geo-specific standards for production and testing.

According to some embodiments, typically at a remote site when a user is going to install a glass panel for a construction project, the user may use a code-reader 1004 to read an identification code or pattern 1003 to retrieve on-production-line testing information from the glass panel production information database 1301. According to some embodiments, information storage and processing facility 1300 and code-reader 1004 are connected via a wired, wireless, or wired-wireless hybrid network 1400. According to some embodiments, 1400 is a cloud. According to some embodiments, code-reader 1004 may be a mobile phone or tablet device installed with certain mobile app or program. According to some embodiments, code-reader 1004 is a specialized code-reader device.

In some embodiments, code-reader 1004 may comprise a light source (not shown in FIG. 1) for emitting light (e.g., visible light and/or invisible light) to a surface of identification code or pattern 1003, a lens (not shown in FIG. 1) coupled to the light source to capture light (e.g., visible light and/or invisible light) reflected from the surface of identification code or pattern 1003, and a light sensor (not shown in FIG. 1) coupled to the lens to convert the reflected light (optical impulses) into electrical impulses to generate a digital image or digital data. In some embodiments, code-reader 1004 may also include a decoder coupled to the light sensor to analyze the digital image or digital data and provide identification code or pattern 1003. In some embodiments, code-reader 1004 may further include a network connection circuitry to connect to information storage and processing facility 1300 via a wireless network, a wired network, or a combination thereof. Also, code-reader 1004 may include a central processor coupled to the above components to retrieve on-production-line testing information from the glass panel production information database 1301 based on identification code or pattern 1003. In some embodiments, code-reader 1004 may further include a display device for displaying the retrieved on-production-line testing information to the user. In some embodiments, code-reader 1004 may be coupled to a computer (not shown in FIG. 1), which includes a network connection circuitry for connecting to information storage and processing facility 1300 to retrieve on-production-line testing information from the glass panel production information database 1301 based on identification code or pattern 1003 and a display device for displaying the retrieved on-production-line testing information to the user.

In some embodiments, code-reader 1004 may comprise an image capturing device (not shown in FIG. 1) to capture an image of identification code or pattern 1003, an image processor (not shown in FIG. 1) coupled to the image capturing device to process the captured image and recognize identification code or pattern 1003. Code-reader 1004 may also include a network connection circuitry (not shown in FIG. 1) for connecting to information storage and processing facility 1300 via a wireless network, a wired network, or a combination thereof. Also, code-reader 1004 may include a central processor (not shown in FIG. 1) coupled to the image capturing device, image processor, and network connection circuitry to instruct the code-reader to retrieve on-production-line testing information from the glass panel production information database 1301 based on identification code or pattern 1003. In some embodiments, code-reader 1004 may further include a display device (not shown in FIG. 1) coupled to the central processor to display the retrieved on-production-line testing information to the user.

In some embodiments, the central processor of code-reader 1004 may be further configured to: retrieve, from a product standard database, a product standard including a required stress for a reinforced glass panel in a particular geographical area based on geographical location information of the code-reader 1004, i.e., the mobile scanning device; compare the retrieved product standard with the retrieved stress information corresponding to the identification code to determine whether the one of the plurality of reinforced glass panels complies with the product standard; and instruct the display device to display a result of the comparison.

According to some embodiments, identification code or pattern 1003 is a two-dimensional code and is linked to the production information data of corresponding glass panel. According to some embodiments, information storage and processing facility 1300 includes a central processing unit 1303 and a glass panel production information database 1301. In some embodiments, glass panel production information database 1301 is deployed remotely from the information storage and processing facility 1300, and is connected to facility 1300 through a wired, wireless, or wired-wireless hybrid network. According to some embodiments, the glass panel manufacturing inquiring information system 1000 also includes a product standard database 1302 deployed on the information storage and processing facility 1300. According to some embodiments, the product standard database 1302 is deployed remotely from facility 1300 and is connected to facility 1300 through a wired, wireless, or wired-wireless hybrid network.

According to some embodiments, code-reader 1004 is implemented to read two-dimensional code 1003 on glass substrate 1002, then the system accesses glass panel production information database 1301 through network, or cloud, 1400 to display glass panel manufacturing information and/or quality information obtained therefrom.

According to some embodiments, a geo-location recognition module 1304 is implemented to recognize a geographical location (which is a point or an area on the Earth's surface, e.g., latitude & longitude coordinates, a country, a state/province, a county, a city, a city district, etc.) of the code-reader device reading two-dimensional code 1003 on glass substrate 1002. Geo-location recognition module 1304 is functionally connected to the central processing unit 1303. Based on the geographical location, module 1304 determines a country and/or an area (e.g., a state/province, a county, and/or a city), where the glass panel is located. In turn, the central processing unit may access the product standard information of the corresponding country and/or area. According to some other embodiments, geo-location recognition module 1304 is an IP address identifying module which can access a list of IP addresses of a plurality of countries and areas. When the code-reader device reads two-dimensional code 1003 on the glass panel and accesses module 1304, module 1304 automatically acquires the IP address of the code-reader device to determine the country or area of the code-reader device based on its IP address. According to some other embodiments, geo-location recognition module 1304 is a GPS system which determines the code-reader device's geo-location based on the code-reader device's GPS location (e.g., latitude and longitude coordinates). According to some other embodiments, a user inputs his/her own geo-location on the code-reader device and transmits it to module 1304.

According to some embodiments, glass panel production information database 1301 is implemented to store glass panel production information. According to some embodiments, glass panel production information also includes product quality information. According to some embodiments, glass panel production information includes information regarding glass panel category, configuration, dimension, thickness and material. According to some embodiments, glass panel production information includes production date, production shift, production operator, and/or tempering process parameters. According to some embodiments, the glass panel is reinforced (i.e., tempered or semi-tempered) glass panel, accordingly, the product quality information includes glass panel waviness, bow, and at least one of the surface stresses. According to some embodiments, the glass panel refers to all of the raw glass panels and the deep processing glass products, as a result, the product quality information varies according to different types of glass panels. For example, when the glass panel is insulated glass, vacuum insulated glass, low-E coated glass, the product quality information includes: thermal insulation property, sealing property, etc. and other related quality information.

According to some embodiments, product standard database 1302 is implemented to store product standard data. According to some embodiments, product standard database 1302 includes product standard data of at least one country or area, and product standard data is national, industrial, or enterprise technical standard which includes product specification (e.g., required stress), parameter, and functionality.

According to some embodiments, central processing unit 1303 retrieves the product information of the glass panel from glass panel production information database 1301 based on the two-dimensional code, retrieves the product standard data from product standard information database 1302 based on the country and/or area where the glass panel is located, and returns the product information and product standard data to code-reader 1004. In some embodiments, central processing unit 1303 may also compare the product information with the product standard data, and returns the result of the comparison to code-reader 1004.

According to some embodiments, the information storage and processing facility 1300 is connected to an ERP (enterprise resource planning) system, the glass panel production information is retrieved from the production line through the ERP system, and the glass panel production information is transmitted to the glass panel production information database. According to some embodiments, the glass panel production information is transmitted to the glass panel production information database directly through a wired, wireless, or wired-wireless hybrid network without going through the ERP system.

According to some embodiments, a method for inquiring the above system includes the following steps. Step one, the system performs an optimization process on a glass substrate 1100 to divide the substrate into a plurality of glass panels and achieve a maximized utility of the substrate, installs an identification code or pattern on each of the plurality of glass panels and stores the optimization information in the identification code or pattern, and creates, in a glass panel production information database 1301, a production information record for each glass panel based on the identification code or pattern. In some embodiments, the system stores the optimization information in database 1301 based on the identification code or pattern. According to some embodiments, glass panel production information also includes product quality information. The system cuts the substrate into the plurality of glass panels based on the optimization information retrieved from or based on identification code or pattern, performs a reinforcing process on the plurality of glass panels, and updates the corresponding glass panel production information.

Step two, the system obtains the glass panel production information on the glass panel deep processing production line 1007 through a control unit 1303 of the production line. According to some embodiments, an on-production-line testing equipment is deployed on the production line to test the glass panel product quality, and such quality information is uploaded to database 1301 through the control unit of the production line. According to some embodiments, the quality information is stored in a record corresponding to the identification code or pattern in the glass panel production information database 1301.

Step three, a code reader 1004 reads an identification code or pattern on a glass panel 1002 and transmits its geo-location information to a geo-location recognition module 1304. The system obtains, from database 1301, production information of the glass panel based on the identification code or pattern and retrieves, from product standard information database 1302, product standard information corresponding to the geo-location information (such as a country, a state/province, a county, and/or city, etc.). The system transmits the production information of the glass panel and the product standard information back to code reader 1004 for display. In some embodiments, the system may further compare the production information with the product standard information to determine whether the glass panel's production (including quality such as stress) complies with the product standard corresponding to the geo-location information, then transmit the comparison result back to the code-reader. In some embodiments, the system transmits the comparison result back to production managers and users to facilitate quality monitoring, quality control, and tracking of quality issues. As a result, safety and reliability of the glass panel during daily usage is increased to improve customer's trust and satisfaction.

According to some embodiments, the product quality information of glass panel 1002 has been obtained through an on-production-line test equipment deployed on the deep processing production line 1007, and uploaded to the production information database by the control unit of the production line. According to some embodiments, the product quality information of the glass panel 1002 may be obtained by an off-production-line test equipment and uploaded into production information database 1301 through a human-machine user interface.

Figure 2:
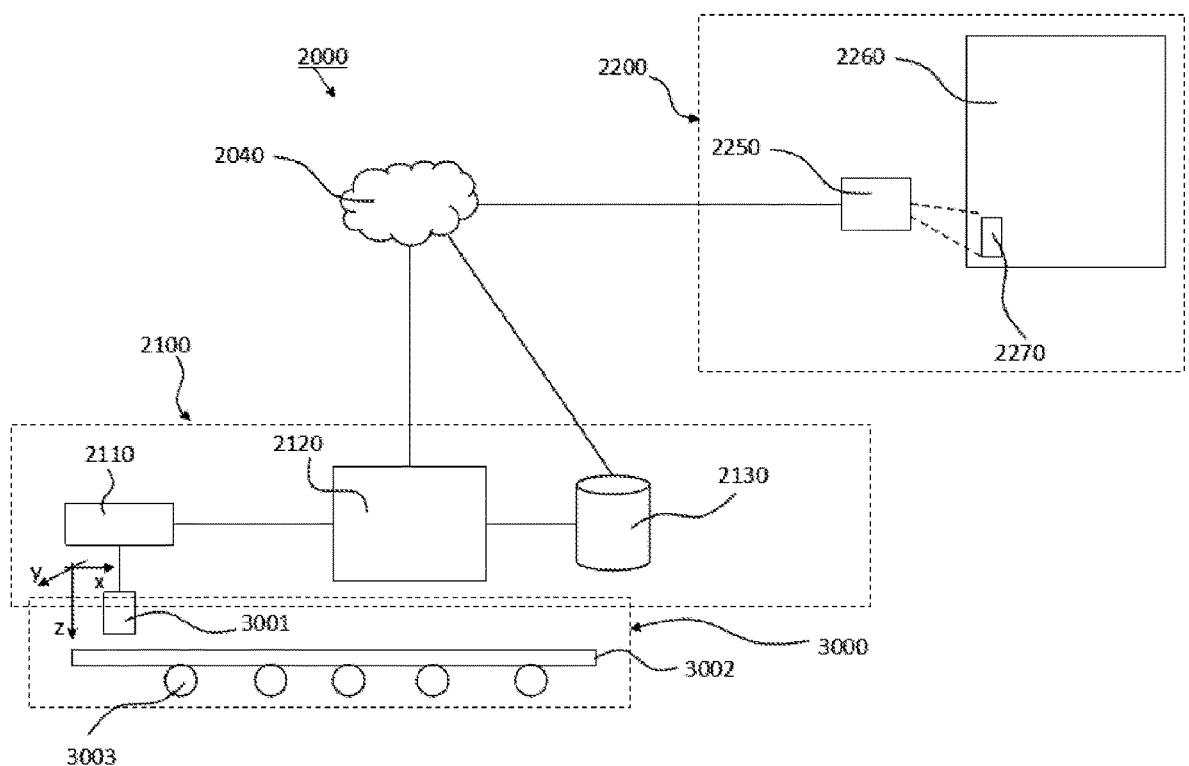
FIG. 2 is a schematic illustration of another exemplary system for inquiring glass panel production information obtained on-production-line, in accordance with some embodiments.

FIG. 2 is a schematic illustration of another exemplary system 2000 for inquiring glass panel production information obtained on-production-line, in accordance with some embodiments. According to some other embodiments, system 2000 includes an information and control facility 2100, a remote testing facility 2200, and an on-production-line quality testing facility 3000.

In some embodiments, information and control facility 2100 includes a sensor controller 2110, a control server 2120 to execute control instructions programmed for specific projects, and a database 2130 coupled to server 2120 to store production and testing information of glass panels. According to some other embodiments, database 2130 is production information database 1301 discussed above. According to some other embodiments, control server 2120 and the database 2130 are both connected to a computer network 2040, which can be the Internet, wide area networks (WANs), local area networks (LANs), wireless networks, or any combination thereof.

In some embodiments, remote testing facility 2200 includes a code-reader device 2250. Code-reader device 2250 can scan an identification code or pattern 2270 implemented on a glass panel 2260.

In some embodiments, on-production-line testing facility 3000 includes a stress sensor 3001, which tests the quality (including the stress) on a plurality of reinforced glass panels, including a glass panel 3002, on a conveyer 3003 of a production line for manufacturing the plurality of reinforced glass panels. On-production-line testing facility 3000 is used for testing the quality of the plurality of reinforced glass panels on the production line, and the testing on glass panel 3002 is for an illustration purpose. According to some other embodiments, stress sensor 3001 is coupled to sensor controller 2110 of the information and control facility 2100. Sensor controller 2110, coupled to control server 2120, controls three-dimensional movements of stress sensor 3001 along a surface of glass panel 3002 and along a vertical direction of glass panel 3002. According to some other embodiments, sensor controller 2110 includes robotic arms and computing processor(s).

According to some other embodiments, at the remote testing facility 2200, a worker uses code-reader device 2250 to scan identification code or pattern 2270 implemented on a corner of the glass panel 2260 and access database 2130 through Network 2040 to retrieve production, testing, and standard information stored in database 2130, as discussed above.

According to some other embodiments, a method for inquiring the above inquiring system illustrated in FIG. 2 is similar to the method for inquiring the system illustrated in FIG. 1. The difference is in the geo-location identification in step three. According to some other embodiments, control server 2120 determines the code-reader device's country or area based on the code-reader device's geo-location (for example, user input of the geo-location, code-reader device IP address, or GPS location), then the corresponding product standard information is obtained and compared to the glass panel product information. According to some other embodiments, a user inputs his or her geo-location on code-reader device 2250 and transmits the geo-location information to the server unit to determine the country or area where the code-reader device is located.

According to some other embodiments, when product standard information database 2130 includes standards of more than two countries or areas, a geo-location identification module is implemented and coupled to server 2120. After production managers and users read the identification code or pattern installed on the glass panels with the code-reader device, the server determines a country and/or an area where the code-reader device is located based on an IP address or a GPS location of the code-reader device. Then the product standard information corresponding to the country or area is automatically obtained to facilitate prompt and convenient inquiry for satisfying customers' need during usage in countries all over the globe.

Figure 3:
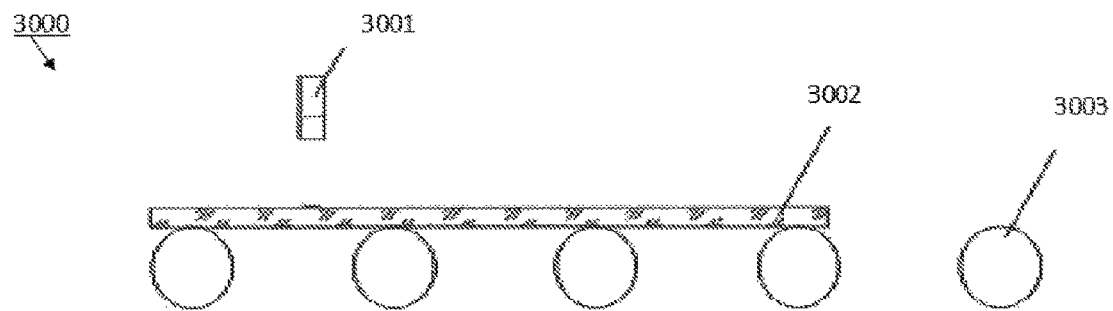
FIG. 3 is a schematic illustration of an exemplary system and method for on-production-line detecting stress information in a glass panel, in accordance with some embodiments.

FIG. 3 is a schematic illustration of an exemplary system and method for on-production-line detecting stress information in a glass panel, in accordance with some embodiments. According to some embodiments, a glass panel stress detecting system 3000 includes a stress sensor 3001, which is deployed on a downstream side of a reinforced-glass-panel production line. Stress sensor 3001 is deployed above a glass panel 3002, which is being transferred on a conveying mechanism 3003. Stress sensor 3001 includes a light source with a wavelength between 450 nm and 600 nm. The method for on-production-line detecting and processing stress information for a plurality of reinforced glass panels, one by one, includes the following steps.

Step one, the system acquires dimensional information and arrangement information of a glass panel (which is one of the plurality of reinforced glass panels) automatically through a control unit, or by manual input through a human-machine interface into the control unit. Next, based on the above information, the control unit calculates a number of test areas and their corresponding location coordinates.

Step two, after reinforcing processing of the glass panel, the system purges an upper or a lower surface of the test areas with compressed air to clean the test areas. The systems then sprays a refractive fluid on stress sensor 3001, and moves the glass panel and/or the stress sensor to determine relative positions of the glass panel and stress sensor. To determine the relative positions of the glass panels and stress sensor, one of the following steps is implemented: maintaining the stress sensor static, and moving the glass panel to position the stress sensor and the test area of the glass panel in a predetermined relative position; maintaining the glass panel static, and moving the stress sensor to position the stress sensor and the test area of the glass panel in a predetermined relative position; or moving both the stress sensor and the glass panel towards to each other to position the stress sensor and the test area of the glass panel in a predetermined relative position.

Step three, the system moves the stress sensor and/or the glass panel along a normal direction of an upper and lower surface of the glass panel, makes the stress sensor touch the test area of the glass panel, keeps a stress level between the stress sensor and the test area no greater than 10 newtons, maintains a touching time between 1 second and 30 seconds (between 2 seconds and 10 seconds in a preferred embodiment), and finishes stress detection. According to some embodiments, the stress information obtained through the detection process includes: compressive stress and/or tensile stress information of the glass panel, and a stress distribution along a tangential direction and a thickness direction of the glass panel.

After step three, the system stores the detected stress information. The information storing step includes: reading the detected stress information, and storing such information into a glass panel production information database through a control unit of the reinforced-glass-panel production line.

Figure 4:
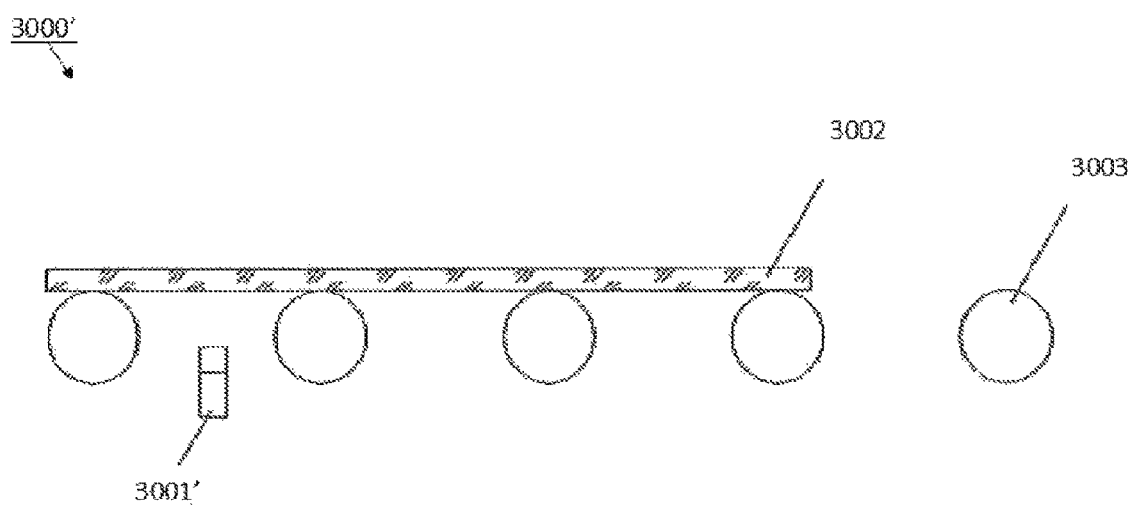
FIG. 4 is a schematic illustration of another exemplary system and method for on-production-line detecting stress information in a glass panel when a stress sensor is located under the glass panel, in accordance with some embodiments.

FIG. 4 is another schematic illustration of another exemplary system 3000' and method for on-production-line detecting stress information in a glass panel 3002 when stress sensor 3001' are located under the glass panel, in accordance with some embodiments. According to some embodiments, stress sensor 3001' are implemented below glass panel 3002, on-production-line stress information detection is achieved from below the surface of glass panel 3002. The embodiment illustrated in FIG. 4 is very similar to the embodiment in FIG. 3 discussed above, the difference is that instead of deploying stress sensor 3001 above glass panel 3002, stress sensor 3001' is deployed below glass panel 3002. All the steps and implementations are very similar to the description above regarding FIG. 3

Figure 5:
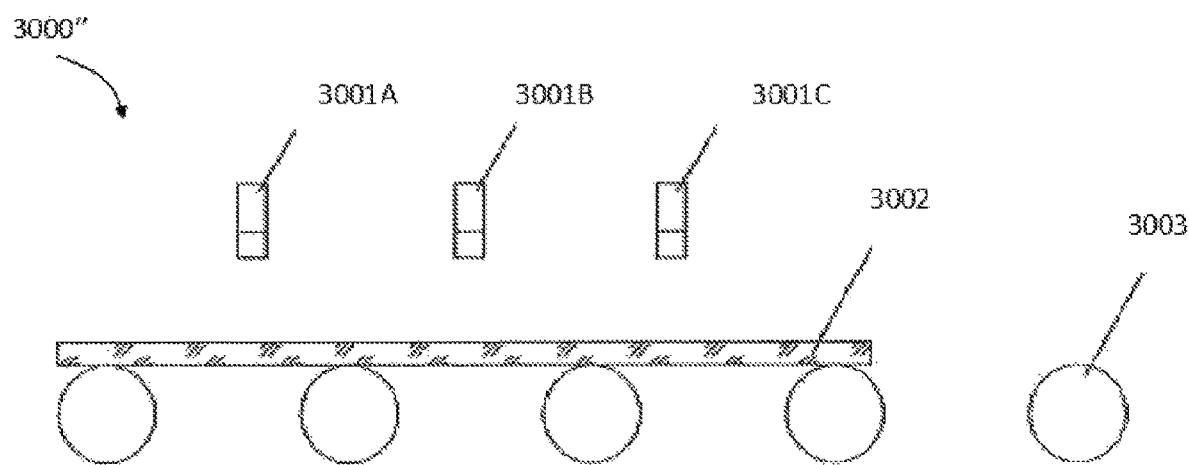
FIG. 5 is a schematic illustration of yet another exemplary system and method for on-production-line detecting stress information in a glass panel when multiple stress sensors are implemented, in accordance with some embodiments.

FIG. 5 is a schematic illustration of yet another exemplary system 3000" and method for on-production-line detecting stress information in a glass panel 3002 when multiple stress sensors are implemented, in accordance with some embodiments. According to some embodiments, a plurality of stress sensors 3001A, 3001B, 3001C, . . . , etc. are implemented to detect stress information simultaneously at a plurality of test areas corresponding to a plurality of stress sensors. According to some embodiments, system 3000" implements a same number of stress sensors as a corresponding number of the test areas on the glass panel to simultaneously detect stress information of all test areas. Each of the plurality of stress sensors works a same way as described above.

Figure 6:
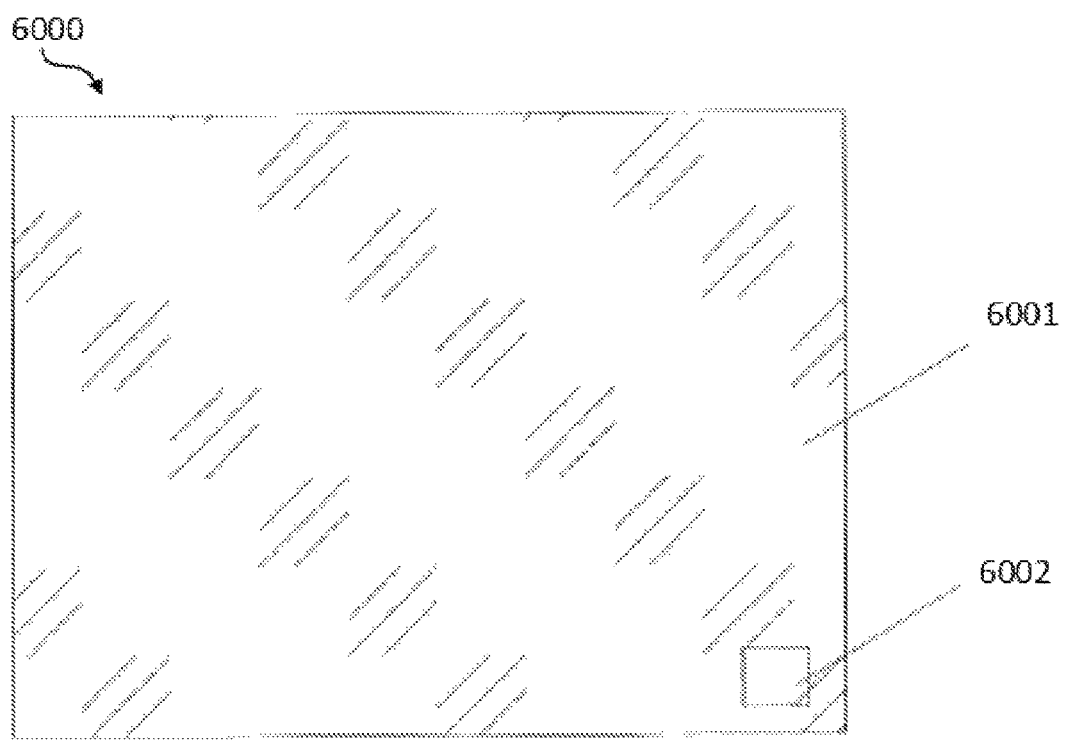
FIG. 6 is a schematic illustration of an exemplary glass panel with a two-dimensional code, in accordance with some embodiments.

FIG. 6 is a schematic illustration of an exemplary glass panel 6000 with a two-dimensional code, in accordance with some embodiments. According to some embodiments, glass panel 6000 includes a glass substrate 6001 and a two-dimensional code 6002. Two-dimensional code 6002 may be implemented on glass substrate 6001 through laser etching, spraying, or screening printing before reinforcing processing. According to some embodiments, two-dimensional code 6002 is located near an edge or a corner of glass substrate 6001 to avoid affecting the use and appearance of the finished product. According to some embodiments, two-dimensional code 6002 is located near a bottom-right corner of glass substrate 6001.

According to some embodiments, two-dimensional code 6002 is linked to a glass panel production information database (not shown in FIG. 6), which includes at least stress information of glass substrate 6001. The stress information can be obtained through reading two-dimensional code 6002. According to some embodiments, the stress information includes compressive stress and tensile stress information of the glass substrate. According to some embodiments, the stress information also includes stress distribution information of glass substrate 6001. According to some embodiments, the stress distribution information includes a stress distribution along a tangential direction and a thickness direction of glass substrate 6001. According to some embodiments, the glass panel production information database also includes information regarding the glass panel's category, configuration, dimension, thickness, and material. According to some embodiments, for the purpose of production management, the glass panel production information database also includes a production date, a production shift, a production operator, and/or tempering process parameters. According to some embodiments, two-dimensional code 6002 is implemented as Code One, MaxiCode, QR Code, Data Matrix, Han Xin Code, or Grid Matrix, etc.

According to some embodiments, two-dimensional code 6002 on the glass substrate 6001 is replaced with a character string linked to the glass panel production information database (not shown in the figure). According to some embodiments, the glass panel production information database includes at least stress information of glass substrate 6001. According to some embodiments, the stress information is retrieved through reading the character string. According to some embodiments, the character string is ASCII codes.

According to some embodiments, the stress information is an important production quality parameter of a reinforced glass panel. Retrieving the stress information by reading a two-dimensional code or character string on glass substrate 6001 makes it easy to obtain glass substrate stress information, which as a result facilitates product quality monitoring and control in a process of reinforced glass panel production. According to some embodiments, in addition to stress information, other information, such as glass panel category, configuration, dimension, thickness, and material information, etc. are also obtained to provide more information to the production managers or product users.

Figure 7:
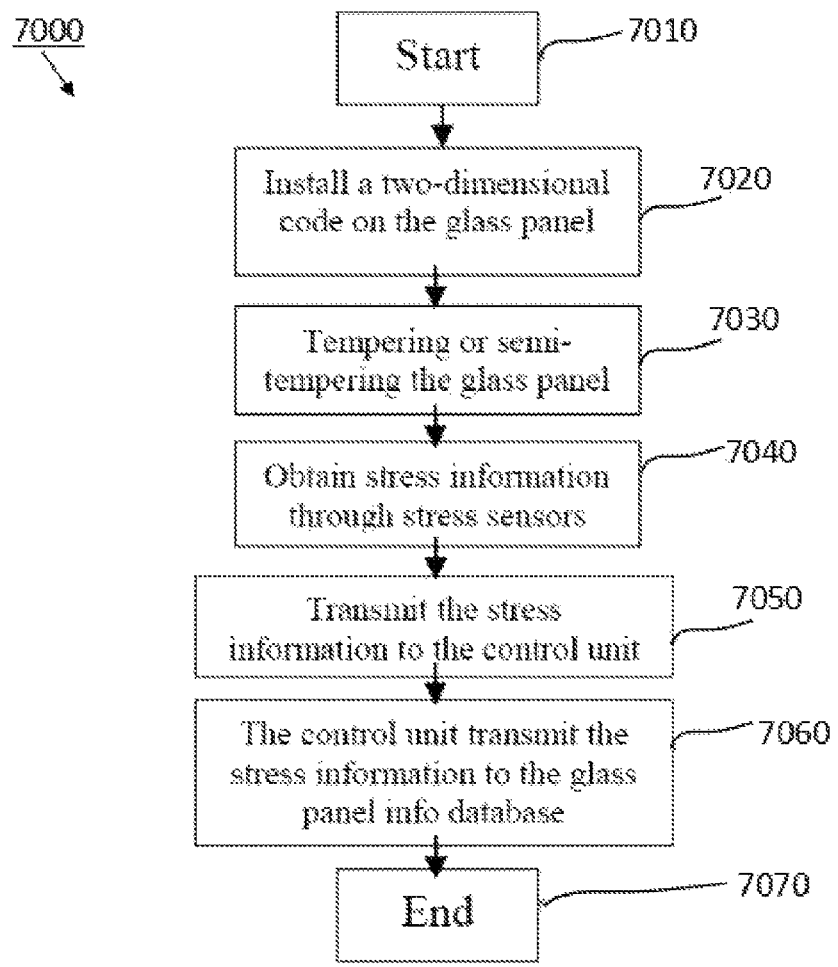
FIG. 7 is a flowchart illustrating an exemplary method for manufacturing glass panels, in accordance with some embodiments.

FIG. 7 is a flowchart illustrating an exemplary method for manufacturing glass panels, in accordance with some embodiments. According to some embodiments, the method includes the following steps. At step 7010, the production process starts. In some embodiments, an optimization process is performed on a glass substrate for dividing/cutting the substrate into a plurality of glass panels. At step 7020, a two-dimensional code is installed on each of the plurality of glass panels and contains the optimization information. According to some embodiments, the two-dimensional code is installed on each glass panel by laser etching, spraying, or screening printing before reinforcing (i.e., tempering or semi-tempering) processing. According to some embodiments, the two-dimensional code is linked to a glass panel production information database. At step 7030, each glass panel installed with the two-dimensional code is reinforced. According to some embodiments, the reinforcing process includes oven heating and tempering cooling processes. At step 7040, stress information of each reinforced glass panel is obtained through stress sensors. At step 7050, the stress information obtained from the stress sensors is transmitted to a control unit. At step 7060, the control unit transmits the stress information and stores it into the glass panel production information database.

According to some embodiments, the raw glass substrate needs to be cut, side-polished and cleaned before reinforcing process. Accordingly, "before reinforcing processing" is understood as: before the raw glass substrate is cut, or after the raw glass substrate is cut but before side-polished, or after side-polished but before cleaning, or after cleaning but before being conveyed to the tempering oven for reinforcing processing.

Figure 8:
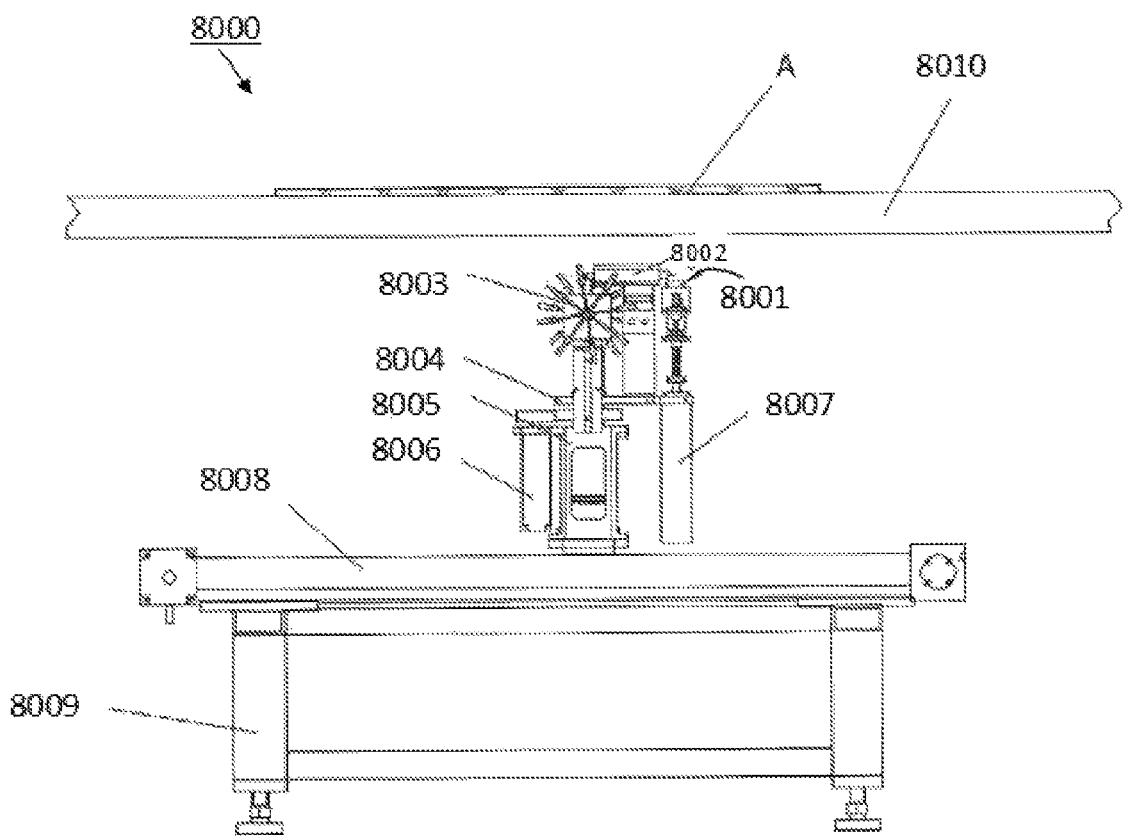
FIG. 8 is a schematic illustration of an exemplary glass panel stress detection apparatus, in accordance with some embodiments.

FIG. 8 is a schematic illustration of an exemplary glass panel stress detection apparatus 8000, in accordance with some embodiments. According to some embodiments, glass panel stress detection apparatus 8000 includes a stress sensor 8001, a refractive fluid spaying mechanism 8002, a refractive fluid purging mechanism 8003, a platform 8004, a supporting frame 8005, a rotating electric motor 8006, a first elevator 8007, a horizontal driving device 8008, and a working bench 8009. In some embodiments, glass panel stress detection apparatus 8000, which is implemented to detect stress information in glass panels being transferred on a conveyor 8010, is deployed below conveyor 8010. According to some other embodiments, glass panel stress detection apparatus 8000 may be deployed above conveyor 8010. According to some other embodiments, glass panel stress detection apparatus 8000 is deployed both above and below conveyor 8010.

Figure 9:
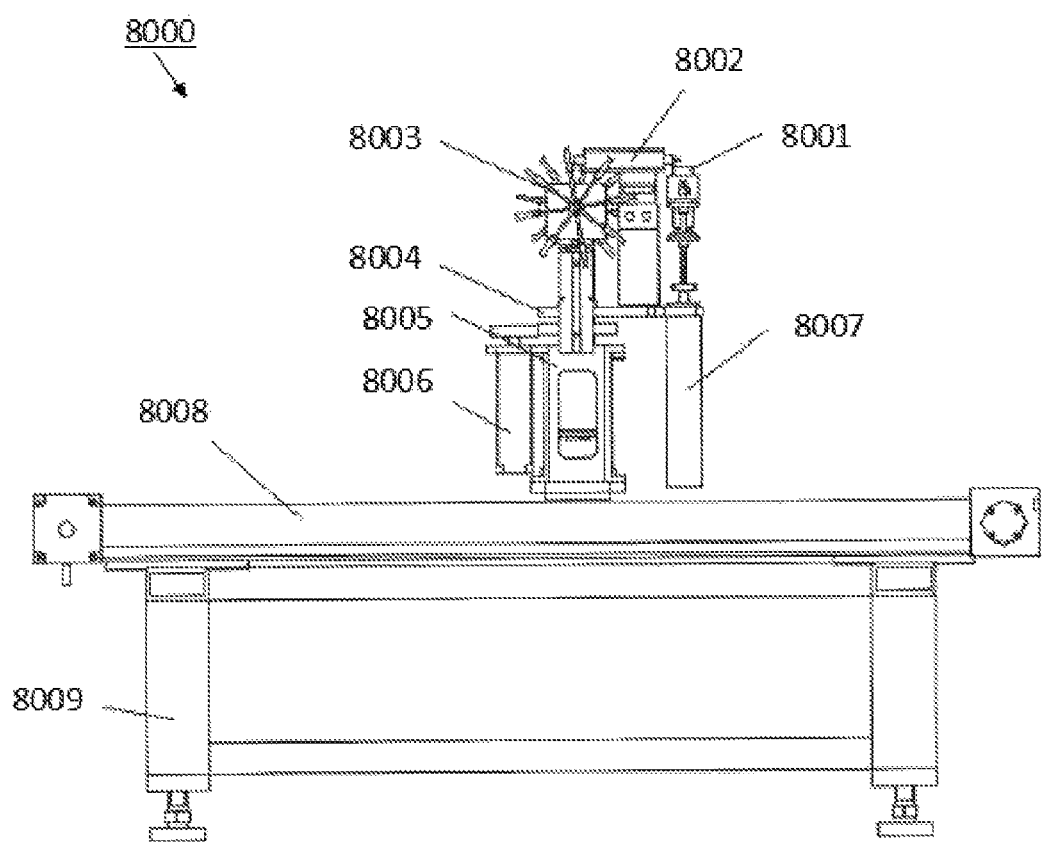
FIG. 9 is a schematic illustration of a front view of the exemplary glass panel stress detection apparatus of FIG. 8, in accordance with some embodiments.
Figure 10:
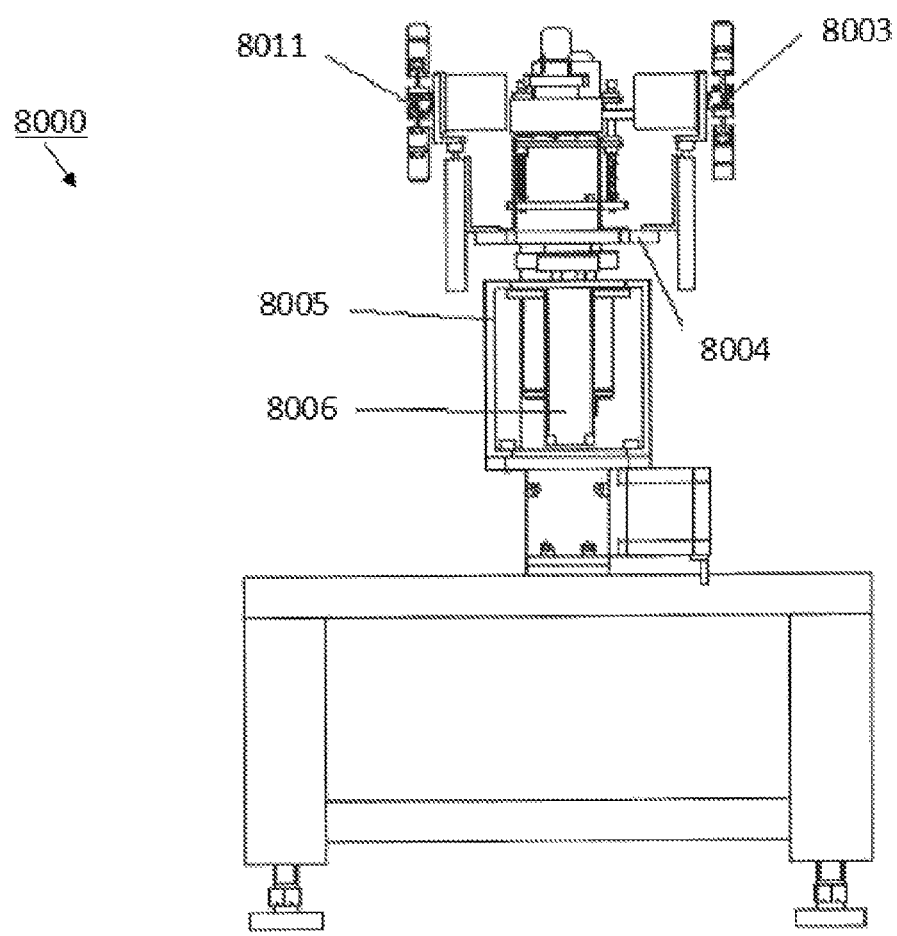
FIG. 10 is a schematic illustration of a side view of the exemplary glass panel stress detection apparatus of FIG. 8, in accordance with some embodiments.

FIG. 9 is a schematic illustration of a front view of glass panel stress detection apparatus 8000 of FIG. 8, in accordance with some embodiments. FIG. 10 is a schematic illustration of a side view of glass panel stress detection apparatus 8000 of FIG. 8, in accordance with some embodiments. As shown in FIG. 8, apparatus 8000 includes a cleaning assembly 8011.

Figure 11:
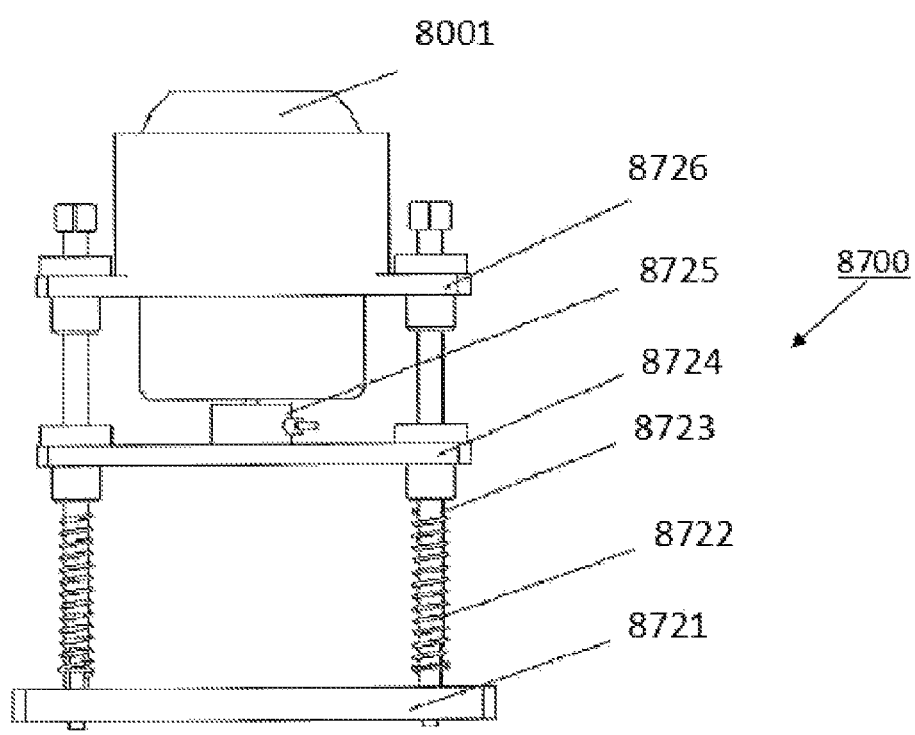
FIG. 11 is a schematic illustration of an exemplary buffer mechanism of the exemplary glass panel stress detection apparatus of FIG. 8, in accordance with some embodiments.

FIG. 11 is a schematic illustration of an exemplary buffer (or cushion) mechanism 8700 of glass panel stress detection apparatus 8000 of FIG. 8, in accordance with some embodiments. As shown in FIG. 11, buffer mechanism 8700 of the glass panel stress detection apparatus 8000 includes: a buffer (or cushion) installation panel 8721, spiral springs 8722, guiding poles 8723, a force sensor installation panel 8724, a force sensor 8725, and a stress sensor installation panel 8726.

Figure 12:
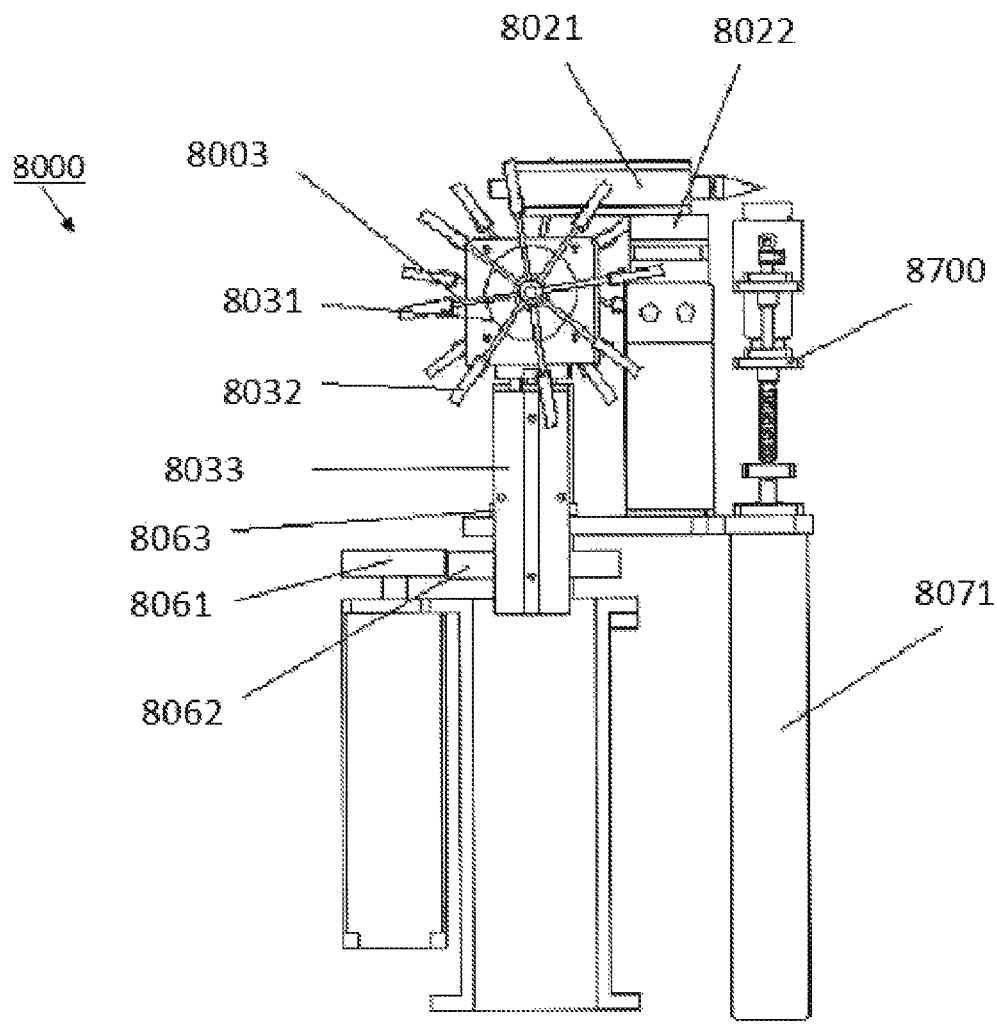
FIG. 12 is a schematic illustration of an exemplary refractive fluid spraying and erasing structure of the exemplary glass panel stress detection apparatus of FIG. 8, in accordance with some embodiments.

FIG. 12 is a schematic illustration of an exemplary refractive fluid spraying and erasing structure of the glass panel stress detection apparatus 8000 of FIG. 8, in accordance with some embodiments. As shown in FIG. 12, the refractive fluid spraying and erasing structure of glass panel stress detection apparatus 8000 includes: a sprayer 8021, a rotating cylinder 8022, a first electric motor 8031, an eraser 8032, a second elevator 8033, a driving gear 8061, a passive gear 8062, a servo cylinder 8071, and a buffer 8700.

Figure 13:
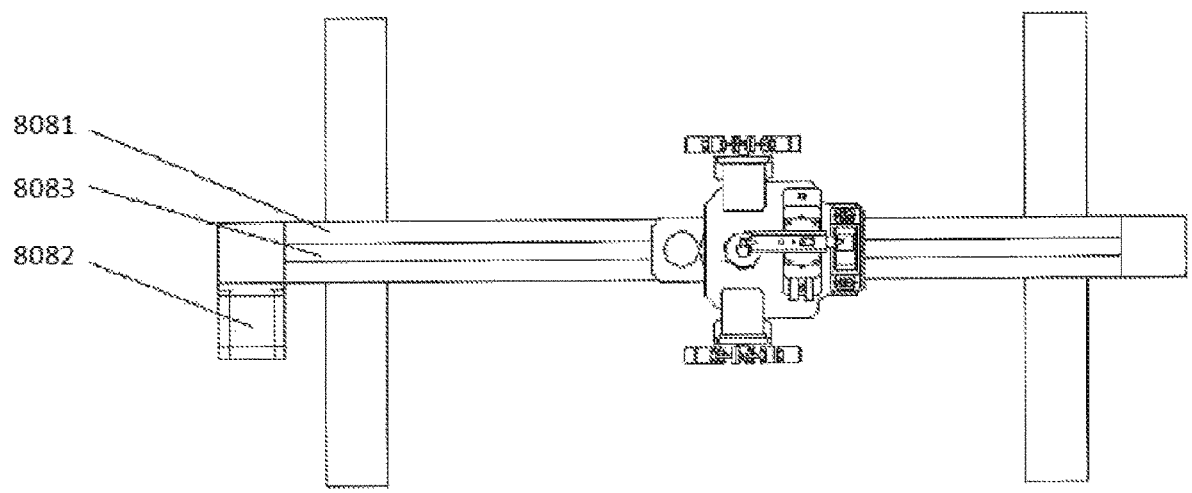
FIG. 13 is a schematic illustration of an exemplary horizontal driving mechanism of the exemplary glass panel stress detection apparatus of FIG. 8, in accordance with some embodiments.

FIG. 13 is a schematic illustration of an exemplary horizontal driving mechanism of the glass panel stress detection apparatus 8000 of FIG. 8, in accordance with some embodiments. As shown in FIG. 13, the horizontal driving mechanism of the glass panel stress detection apparatus 8000 includes: a supporting beam 8081, a horizontal driving motor 8082, and a transmission 8083.

Figure 14:
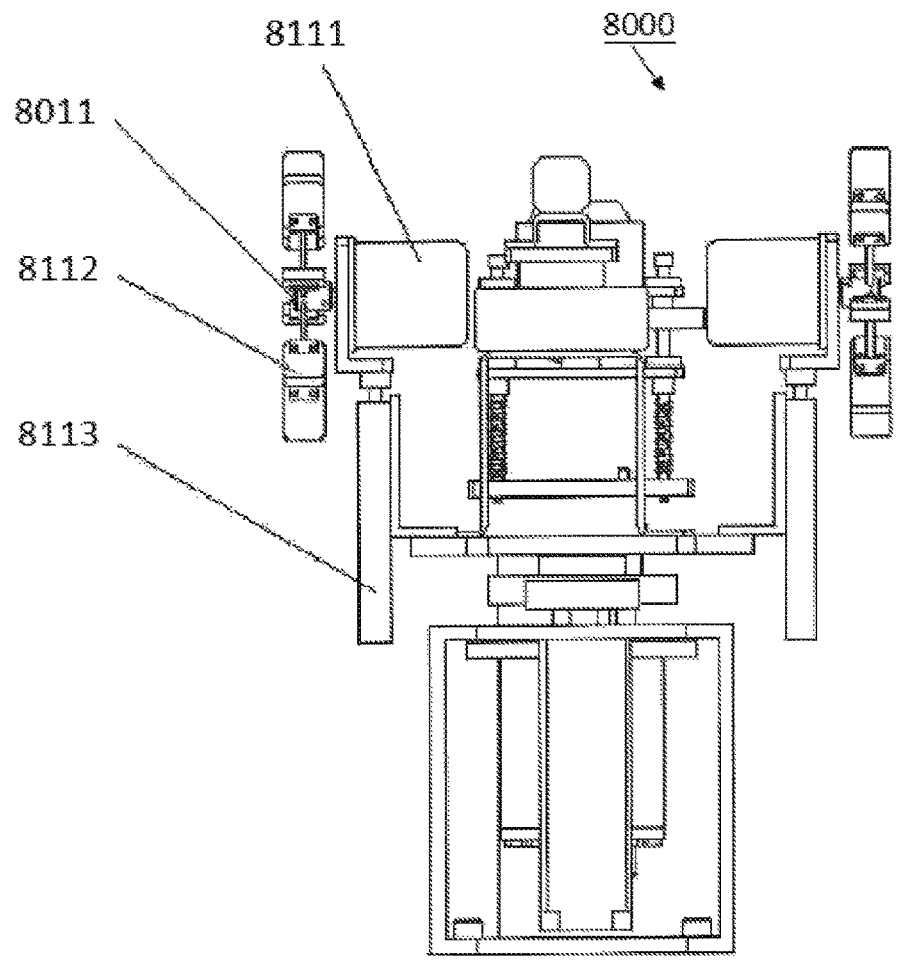
FIG. 14 is a schematic illustration of an exemplary cleaning mechanism of the glass panel stress detection apparatus of FIG. 8, in accordance with some embodiments.

FIG. 14 is a schematic illustration of an exemplary cleaning mechanism of the glass panel stress detection apparatus 8000 of FIG. 8, in accordance with some embodiments. As shown in FIG. 14, the cleaning mechanism of glass panel stress detection apparatus 8000 includes a cleaning assembly 8011, which further includes: a cleaning motor 8111, a cleaning head 8112, and a third elevator 8113.

Referring to FIGS. 8, 9, 10, and 11, according to some other embodiments, the glass panel stresses detection apparatus 8000 includes: working bench 8009, test mechanism, horizontal driving device 8008. As illustrated in FIG. 8, working bench 8009 is implemented to fix the entire stress detection apparatus to a testing location, for example, below the conveyor 8010 of the tempered glass panel production line.

Referring to FIGS. 8, 9, and 11, the test mechanism includes: stress sensor 8001, refractive fluid spaying mechanism 8002, platform 8004, and first elevator 8007. According to some other embodiments, refractive fluid purging mechanism 8003 is implemented on platform 8004 to promptly erase a refractive fluid on a surface of a glass panel after a stress test to keep the surface of the glass panel clean, and to avoid the pollution of the conveyor 8010. According to some other embodiments, stress sensor 8001 is implemented to detect stress information of a glass panel A and is implemented on platform 8004 through first elevator 8007.

Referring to FIGS. 9 and 12, according to some embodiments, first elevator 8007 includes servo cylinder 8071 and buffer 8700. One end of servo cylinder 8071 is fixed on platform 8004, and its screws extends through and above platform 8004. According to some embodiments, stress sensor 8001 is implemented on the screw of servo cylinder 8071 through buffer 8700. According to some embodiments, servo cylinder 8071 provides a driving force for a lift of stress sensor 8001. According to some embodiments, other known driving mechanisms such as lift motors and cylinders, etc. are implemented to replace the servo cylinder 8071.

Referring to FIGS. 11 and 12, according to some embodiments, buffer (cushion) mechanism 8700 includes: buffer (or cushion) installation panel 8721, spiral springs 8722, guiding poles 8723, force sensor installation panel 8724, force sensor 8725, and stress sensor installation panel 8726. According to some embodiments, one end of guiding poles 8723 is fixed on buffer installation panel 8721. And guiding poles 8723 also pass through spiral springs 8722, force sensor installation panel 8724, and stress sensor installation panel 8726, from bottom to top. According to some embodiments, the two ends of the spiral springs 8722 respectively touch force sensor installation panel 8724 and buffer installation panel 8721. According to some embodiments, stress sensor 8001 is fixed on stress sensor installation panel 8726, and force sensor 8725 is implemented on force sensor installation panel 8724 to measure an elastic force of spiral springs 8722.

According to some embodiments, with the implementation of force sensor 8725, a predetermined pressure is maintained on a surface of the glass panel during the stress testing by stress sensor 8001 to ensure the accuracy of testing. According to some embodiments, the screw of servo cylinder 8071 extends upward, driving stress sensor 8001 upward until it touches glass panel A and exert a predetermined pressure on the glass panel A. According to some embodiments, buffer mechanism 8700 is implemented to avoid damages to the servo cylinder during an elevation of the screw and during the testing. According to some embodiments, buffer mechanism 8700 is implemented to also avoid damages to the glass panel due to excessive pressure exerted on it for other reasons.

Referring to FIGS. 9 and 12, refractive fluid spaying mechanism 8002 includes a sprayer 8021 for spraying a refractive fluid to a surface of glass panel A, and a rotating cylinder 8022 for driving sprayer 8021 to rotate relative to a predetermined axis. Sprayer 8021 is fixed on rotating cylinder 8022, which is installed on platform 8004.

As illustrated in FIGS. 10 and 12, refractive fluid purging mechanism 8003 includes a plurality of erasers 8032 and a first electric motor 8031. According to some embodiments, the plurality of erasers 8032 are implemented on an output axle of first electric motor 8031 along a radial direction of axle cross section, and first electric motor 8031 is fixed on platform 8004 through a second elevator 8033. According to some embodiments, during the operation, sprayer 8021 sprays a refractive fluid to the testing area of glass panel A. The rotating cylinder 8022 drives sprayer 8021 to rotate at a predetermined angle, providing a sufficient space for an elevation of stress sensor 8001 until it touches glass panel A. When the stress testing is finished, rotating cylinder 8022 drives sprayer 8021 back to a reset position. Then, second elevator 8033 and first electric motor 8031 are started to elevate erasers 8032 to erase the refractive fluid off the surface of glass panel A.

As illustrated in FIGS. 9 and 13, horizontal driving device 8008 is installed on working bench 8009 to drive platform 8004 to reciprocate along a direction vertical to a conveying direction (horizontal) of glass panel A. According to some embodiments, horizontal driving device 8008 includes: a supporting frame 8005, a supporting beam 8081, and a reciprocate mechanism. According to some embodiments, the reciprocate mechanism further includes: a horizontal driving motor 8082 and a transmission 8083. According to some embodiments, supporting frame 8005 is installed on supporting beam 8081 in such a manner to allow supporting frame 8005 to reciprocate along an axis of supporting beam 8081.

According to some embodiments, platform 8004 is installed on supporting frame 8005 through a shaft, which enables platform 8004 to rotate around an axis of the supporting frame 8005. According to some embodiments, transmission 8083 is preferably a timing belt. According to some embodiments, transmission 8083 is other transmission mechanism based on a specific requirement. According to some embodiments, transmission 8083 includes a pair of master and slave wheels engaged through a timing belt. The mater wheel is fixed with an output axle of horizontal driving motor 8082, supporting frame 8005 is fixed with the timing belt, and supporting frame 8005 is driven by horizontal driving motor 8082 and the timing belt to reciprocate along supporting beam 8081.

Preferably, according to some embodiments, a rotating axle is implemented on platform 8004, and platform 8004 is capable of rotating around the axle to drive stress sensor 8001, refractive fluid spaying mechanism 8002, and/or refractive fluid purging mechanism 8003 to the testing area of glass panel A and execute corresponding operations. According to some embodiments, platform 8004 executes the above operation in a linear motion manner.

As illustrated in FIGS. 9 and 12, the testing mechanism also includes a rotating electric motor 8006 to rotate the platform 8004. According to some embodiments, a driving gear 8061 is installed on an end of the output axle of rotating electric motor 8006, a passive gear 8062 engaged to driving gear 8061 is installed on the axle. When driving gear 8061 rotates, it drives platform 8004 to rotate the axle.

Preferably, a cleaning assembly 8011 is installed on platform 8004 to clean the testing area on glass panel A. According to some embodiments, before stress testing, the testing area is cleaned with cleaning assembly 8011 to get rid of dust and other unwanted objects on a surface of the glass panel to ensure an even distribution of refractive fluid for accurate testing. According to some embodiments, the cleaning also protects stress sensor 8001 from damages caused by dusts and hard particles. As illustrated in FIGS. 10 and 14, cleaning assembly 8011 is installed on platform 8004 to clean the testing area on the glass panel. According to some embodiments, cleaning assembly 8011 includes: a cleaning motor 8111 for driving the cleaning heads, a plurality of cleaning heads 8112 for cleaning the glass panel, and a third elevator 8113. According to some embodiments, the plurality of cleaning heads 8112 are implemented on the output axle of the cleaning motor 8111 along a radial direction of axle cross section, cleaning motor 8111 is fixed on platform 8004 through a third elevator 8113.

According to some embodiments, during the operation, if there are dusts and other debris on the surface of the glass panel A, before spraying of the refractive fluid, third elevator 8113 drives cleaning motor 8111 to elevate until the plurality of cleaning heads 8112 touch the lower surface of the glass panel A, then cleaning motor 8111 is started to drive the plurality of cleaning heads 8112 to clean the surface of the glass panel A. After the cleaning, third elevator 8113 drives cleaning assembly 8011 to a reset position. According to some other embodiments, cleaning assembly 8011 alternatively includes: an air nozzle (not shown in the figures) installed on platform 8004, a compressed air source (not shown in the figures) connected to the air nozzle through air pipelines, and the cleaning of the testing area on the glass panel A is achieved by blowing compressed air to the testing area on the glass panel A.

According to some embodiments, during operation, glass panel A is conveyed to a position below (or above) stress sensor 8001 by conveyor 8010, a testing area on glass panel A is vertically aligned to lens of stress sensor 8001. The refractive fluid spraying mechanism starts operation, and sprayer 8021 sprays a certain amount of the refractive fluid on the lens of stress sensors 8001 and/or the testing area of the glass panel. The rotating cylinder 8022 rotates sprayer 8021 around a predetermined axis by a predetermined angle, resets the refractive fluid spaying mechanism 8002 to provide a sufficient working space for stress sensor 8001. Then, first elevator 8007 drives stress sensor 8001 to touch the testing area on glass panel A and exerts a predetermined pressure on the testing area to finish stress testing on the testing area of the glass panel. After the testing is finished, first elevator 8007 drives stress sensor 8001 to a reset position. Then, horizontal driving device 8008 drives platform 8004 to drive stress sensor 8001 and refractive fluid spaying mechanism 8002 to move to a next testing area on glass panel A along a direction perpendicular to a conveying direction of the conveyor 8010. After all the testing is accomplished on all the testing areas along a longitudinal direction, conveyor 8010 displaces the glass panel for a predetermined distance to continue testing on other testing areas.

The sequence numbers of the foregoing embodiments of the present disclosure are merely for illustrative purposes, and are not intended to indicate priorities of the embodiments.

It will now be appreciated by one of ordinary skill in the art that the illustrated methods can be altered to delete steps, change the order of steps, or include additional steps. The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, single central processing unit (CPU) chip, a CPU chip combined on a motherboard, a general purpose computer, or any other combination of devices or modules capable of performing the methods disclosed herein.

It will now also be appreciated by one of ordinary skill in the art that the devices disclosed herein can be altered to remove some components, combine some components into one, or include additional components.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A mobile scanning device for retrieving stress information of one of a plurality of reinforced glass panels, comprising:

an image capturing device to capture an image of an identification code installed on a surface of the one of the plurality of reinforced glass panels, wherein the identification code is unique to each of the plurality of reinforced glass panels;

an image processor, coupled to the image capturing device, to process the captured image and recognize the identification code;

a central processor, coupled to the image processor, to instruct the mobile scanning device to retrieve stress information corresponding to the identification code from a glass panel production information database; and a display device, coupled to the central processor, to display the retrieved stress information;

wherein the stress information was obtained via at least one stress sensor testing a stress at different testing locations on a surface of each of a plurality of glass panels being processed on a production line for manufacturing the plurality of reinforced glass panels;

wherein the central processor is further configured to:
retrieve, from a product standard database, a product standard including a required stress for a reinforced glass panel in a particular geographical area based on geographical location information of the mobile scanning device;
compare the retrieved product standard with the retrieved stress information corresponding to the identification code to determine whether the one of the plurality of reinforced glass panels complies with the product standard; and
instruct the display device to display a result of the comparison.

2. A method for a mobile scanning device for retrieving stress information of one of a plurality of reinforced glass panels, comprising:

capturing, via a mobile scanning device, an image of an identification code installed on a surface of the one of the plurality of reinforced glass panels, wherein the identification code is unique to each of the plurality of reinforced glass panels;

processing the captured image to recognize the identification code;

instructing the mobile scanning device to retrieve stress information corresponding to the recognized identification code from a glass panel production information database;

displaying the retrieved stress information on the mobile scanning device;

retrieving, from a product standard database, a product standard including a required stress for a reinforced glass panel in a particular geographical area based on geographical location information of the mobile scanning device;

comparing the retrieved product standard with the retrieved stress information corresponding to the recognized identification code to determine whether the one of the plurality of reinforced glass panels complies with the product standard; and displaying a result of the comparison on the mobile scanning device;

wherein the stress information was obtained via at least one stress sensor testing a stress at different testing locations on a surface of each of a plurality of glass panels being processed on a production line for manufacturing the plurality of reinforced glass panels.

3. A glass panel on-production-line stress testing and retrieving system, comprising:

an identification code installed on a surface of each of a plurality of glass panels, wherein the identification code is unique to each of the plurality of glass panels;

at least one stress sensor to test a stress at different testing locations on the surface of each of the plurality of glass panels being processed on a production line for manufacturing reinforced glass panels, and to obtain the stress information;

a sensor controller to place the at least one stress sensor on the different testing locations, wherein the sensor controller moves the at least one stress sensor along a direction parallel to the surface of each of the plurality of glass panels and along a direction vertical to the surface of each of the plurality of glass panels;

a glass panel production information database to store the stress information based on the identification code;

a product standard database to provide a product standard including a required stress for a reinforced glass panel in a particular geographical area; and a control server coupled to the product standard database to retrieve the product standard based on geographical location information of the mobile scanning device, compare the retrieved product standard with the retrieved stress information corresponding to the identification code to determine whether the one of the plurality of glass panels complies with the product standard, and return a comparison result to the mobile scanning device;

wherein the glass panel production information database provides stress information corresponding to an identification code installed on a surface of one of the plurality of glass panels upon a mobile scanning device reads the identification code and submits a retrieval request.

4. The glass panel on-production-line stress testing and retrieving system of claim 3, wherein the identification code is a two-dimensional code, a bar code, or a character string.

5. The glass panel on-production-line stress testing and retrieving system of claim 3, wherein the identification code is printed on the surface of each of the plurality of glass panels.

6. The glass panel on-production-line stress testing and retrieving system of claim 3, wherein the identification code is laser printed on the surface of each of the plurality of glass panels.

7. A glass panel on-production-line stress testing and retrieving method, comprising:

installing an identification code on a surface of each of a plurality of glass panels, wherein the identification code is unique to each of the plurality of glass panels;

establishing a record in a glass panel production information database using the identification code for each of the plurality of glass panels;

processing each of the plurality of glass panels using a reinforcing process;

saving processing information into the glass panel production information database based on the identification code;

conducting, via at least one stress sensor, stress testing on each of the plurality of glass panels to derive stress information;

saving the stress information into the glass panel production information database using the identification code;

reading, via a code-reader device, the identification code on the surface of one of the plurality of glass panels to retrieve stress information based on the identification code, wherein the reading is conducted at a remote location distant from where the reinforcing process and stress testing were conducted;

obtaining, from a product standard database, a product standard based on geographical location information of the code-reader device;

comparing the obtained product standard with the stress information retrieved based on the identification code to determine whether the one of the plurality of glass panels complies with the product standard; and returning a comparison result to the code-reader device.

8. The glass panel on-production-line stress testing and retrieving method of claim 7, further comprising:

displaying the retrieved processing information and stress testing information on a user interface local to where the reading is conducted.

9. A reinforced glass panel, comprising:

a glass plate, which was one of a plurality of glass plates that were processed on a production line for manufacturing a plurality of reinforced glass panels; and a first identification code installed on a surface of the glass plate, wherein the first identification code being an identification code installed on a surface of each of the plurality of glass plates respectively, and the identification code is unique to each of the plurality of glass plates;

wherein:

stress information for each of the plurality of reinforced glass panels was obtained via at least one stress sensor testing a stress at different testing locations on a surface of the each of the plurality of reinforced glass panels on the production line, and was stored in a glass panel production information database based on the identification code;

stress information of the reinforced glass panel is retrieved based on the first identification code being read via a mobile scanning device;

a product standard including a required stress for the reinforced glass panel in a particular geographical area is retrieved from a product standard database based on geographical location information of the mobile scanning device;

the retrieved product standard is compared with the retrieved stress information of the reinforced glass panel to determine whether the reinforced glass panel complies with the product standard; and a result of the comparison is displayed on the mobile scanning device.

* * * * *